UNITED STATES PATENT OFFICE.

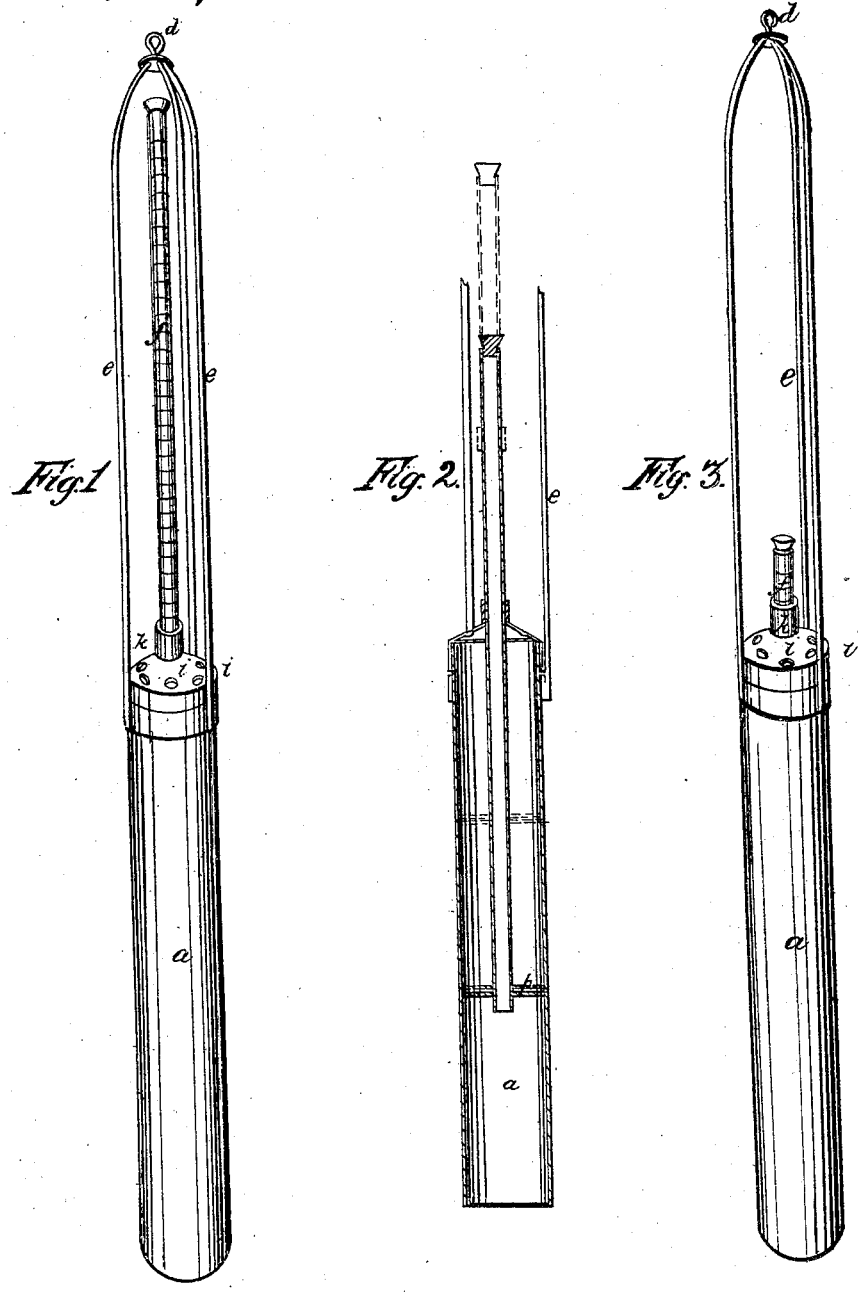

GEORGE W. McCORD, OF INDEPENDENCE COUNTY, ARKANSAS, ASSIGNOR TO HIMSELF, J. F. LOBDELL, OF CENTRALIA, ILLINOIS, AND P. V. N. DAVIS, OF RUSH, NEW YORK.

DEEP-SEA-SOUNDING APPARATUS.

Specification of Letters Patent No. 25,547, dated September 20, 1859.

*To all whom it may concern:*

Be it known that I, G. W. McCord, of the county of Independence and State of Arkansas, have invented a new and useful Improvement in Instruments for Deep-Sea Sounding; and I hereby declare the following to be a full, clear, and exact description thereof, reference being had to the accompanying drawings, making part of this specification.

My invention relates to the arrangement of a piston within a suitable cylinder, in such manner, that the pressure of the water will force the piston into the cylinder, as the instrument descends in the water, and also in combination therewith a graduated scale and provision for measuring, the depth to which the instrument descends, as hereinafter described.

By reference to the accompanying drawings Figure 1, is an external view of the instrument with all its parts in position to be thrown into the water. Fig. 2 is a sectional elevation showing the piston as being forced, partially, down the cylinder. Fig. 3, is an external view of the instrument as it appears, at its lowest descent in the water.

(*a*) is a strong metallic cylinder, provided with long rods (*e*) which converge at their upper ends and are secured to the swivel (*d*).

(*f*) is a graduated scale, and operates as a piston rod. It is formed hollow, and passes through the piston (*p*) so as to communicate with the air contained in the cylinder.

(*p*) is a piston made to fit, and work air tight into the cylinder (*a*).

(*i*) is a perforated cap, firmly secured to the top of the cylinder (*a*) and serves as a guide to the scale (*f*).

The perforations (*i*) allow free ingress of the water to the upper surface of the piston (*p*) as the instrument descends, and egress as it ascends, and the pressure is removed.

(*k*) is a register clasp made to fit the scale (*f*) closely, but in such manner, that it will slip upon the scale, as the piston is forced into the cylinder by the pressure of the water and the scale (*f*) consequently drawn down; as the instrument is withdrawn from the water, and the piston returns in the cylinder, the register (*k*) is carried up with the scale (*f*) thus indicating the depth to which the instrument had descended.

The return, of the piston being secured by the elasticity of the air contained in the cylinder a stop cock may be arranged at the top of the scale (*f*) to admit air when required.

The cylinder (*a*) may be surrounded with a casing of lead to secure its descent in the water.

What I claim as my invention and desire to secure by Letters Patent is—

The arrangement of the cylinder (*a*) piston (*p*) graduated scale (*f*) cap (*i*) and vernier or register (*k*) constructed and operating substantially as described for the registration of marine soundings upon the principle of hydrostatic pressure.

In testimony of which invention I have hereunto set my hand.

G. W. McCORD.

Witnesses:
BURREL HENLEY,
JOHN HAMPTON.